United States Patent [19]

Loginov

[11] Patent Number: 4,823,365
[45] Date of Patent: Apr. 18, 1989

[54] SYNCHRONIZATION METHOD AND ELASTIC BUFFER CIRCUIT

[75] Inventor: Boris Z. Loginov, San Diego, Calif.

[73] Assignee: Honeywell, Inc., Minneapolis, Minn.

[21] Appl. No.: 211,655

[22] Filed: Jun. 28, 1988

[51] Int. Cl.[4] .................... H04L 25/36; H04L 25/40
[52] U.S. Cl. .................................. 375/118; 375/113; 370/108
[58] Field of Search ............... 375/106, 108, 118, 113; 370/102, 108; 328/37, 63; 307/208, 269

[56] References Cited

U.S. PATENT DOCUMENTS

| | | | |
|---|---|---|---|
| 3,825,683 | 7/1974 | Pitroda et al. | 375/118 |
| 4,301,417 | 11/1981 | Jansen et al. | 375/108 |
| 4,392,234 | 7/1983 | Maruta | 370/108 |
| 4,429,386 | 1/1984 | Graden | 375/118 |
| 4,525,849 | 6/1985 | Wolf | 328/55 |
| 4,580,279 | 4/1986 | Kahn | 370/102 |
| 4,764,942 | 8/1988 | Shigaki et al. | 375/118 |

Primary Examiner—Robert L. Griffin
Assistant Examiner—Stephen Chin
Attorney, Agent, or Firm—C. Lamont Whitham; Michael E. Whitham

[57] ABSTRACT

An asynchronous communication system includes a clock recovery circuit (2) to which the received signal (1) is applied and which provides recovered data (3) to a frame delimiter detector (4). The frame delimiter detector in turn generates a frame start signal to a frame sync generator (16) and provides asynchronous data (5) to an elastic buffer (7) which provides as its output the synchronized data (8). The clock recovery circuit also provides a recovered clock signal (9) to a clock guarding circuit (12). The clock guarding circuit (12) receives a local clock signal (11) and produces a guarded clock signal (13) and a data clock signal (14), both of which are supplied to the frame sync generator and the elastic buffer. The frame sync generator produces a frame sync signal having a duration determined by the active edges of the guarded clock and data clock signals, and this signal is used to load a mask pattern in the elastic buffer. The synchronization method uses the guarded clock signal derived from the recovered clock signal so that the recovered clock signal cannot switch within certain zones on either side of each active edge of the data clock signal.

5 Claims, 3 Drawing Sheets

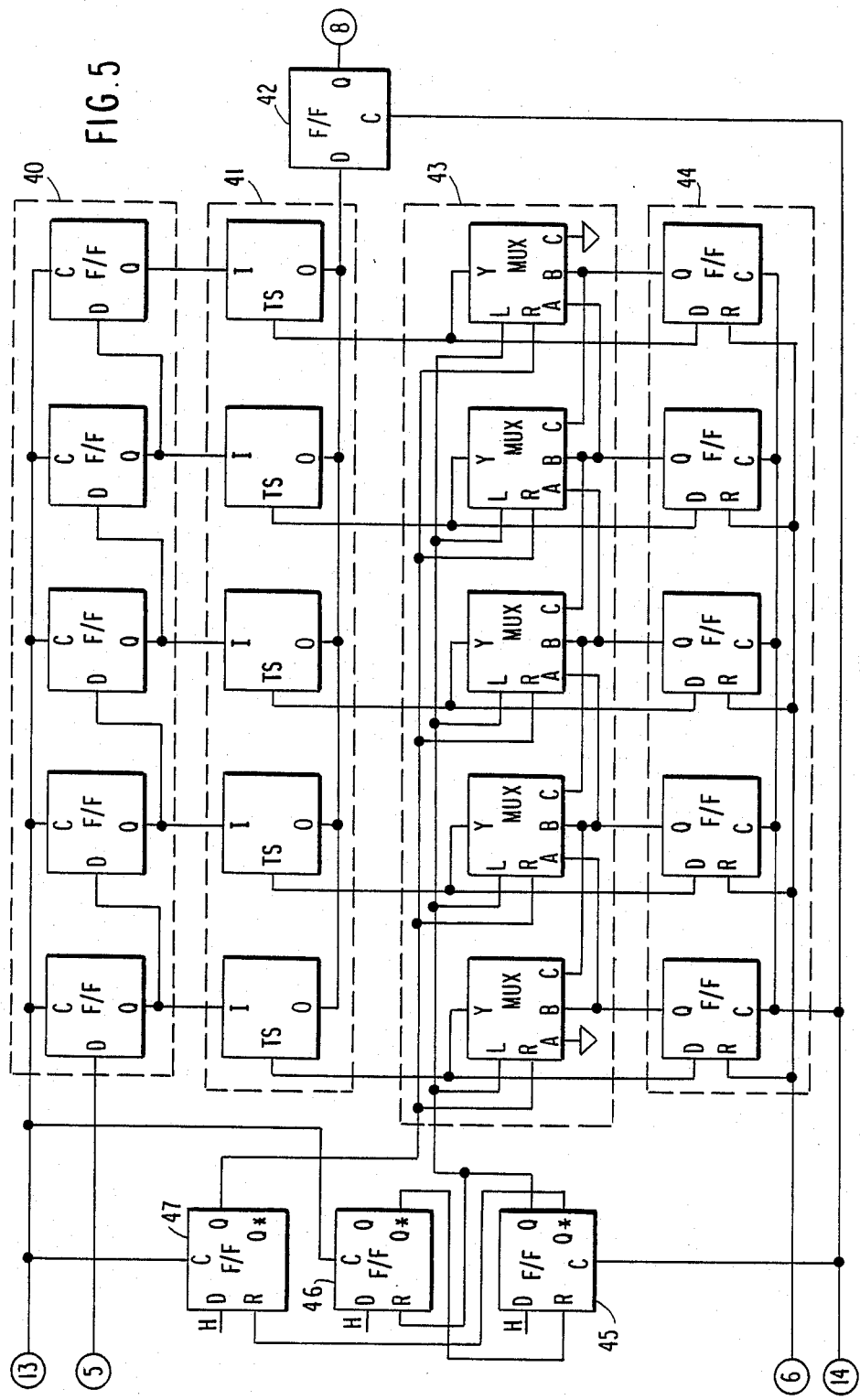

SYNCHRONIZATION METHOD AND ELASTIC BUFFER CIRCUIT

BACKGROUND OF THE INVENTION

1. Field of the Invention

The present invention generally relates to digital communications and, more particularly, to a method of synchronization for asynchronous communication when data is transmitted using one clock signal and then must be synchronized with another clock signal of the same nominal frequency at the receiving station. The technique according to the invention allows the use of asynchronous communication where synchronous communication had previously been required.

2. Description of the Prior Art

The problem addressed by the present invention is the special case of transmitting data between two systems working at the same nominal frequency. Moreover, the invention is intended for use in high speed data transmission requiring the avoidance of clocks with frequencies higher than the data bit rate.

A common synchronization technique used in the prior art is to synchronize received data to a local clock signal using a D-type flip-flop. This technique, however, produces errors whenever setup and hold time specifications for the flip-flop are violated. Another technique commonly used in the prior art is to use a first-in, first-out (FIFO) register to provide the necessary elasticity required to properly synchronize the received data to the local clock signal. The use of a FIFO register, however, results in a certain ripple through delay and initialization problems associated with such a register. Further, some synchronization techniques are dependent on certain hardware characteristics. One such characteristic is a metastability problem which shows up whenever a flip-flop is clocked without a guaranteed setup and/or hold time, which is exactly what happens when efforts are made to synchronize the data with a new clock.

Specific examples of prior art synchronization systems include U.S. Pat. Nos. 3,825,683 to Pitroda et al. and 4,119,796 Jones. These, however, require a clock signal with a frequency which is four times the nominal data bit rate. U.S. Pat. No. 4,525,849 to Wolf describes a synchronization technique which is aimed at data transmission between a computer and peripherals that may run at different speeds. This design uses an elaborate buffer memory and does not guarantee a fixed delay for a retransmitted signal. U.S. Pat. Nos. 3,887,769 to Cichetti and 4,070,630 to Hepworth ignore the metastability phenomenon and do not condition or guard the two free running clocks before using them in the synchronization circuitry. Therefore, the bit error rate in either design will depend on the characteristics of the hardware.

SUMMARY OF THE INVENTION

It is therefore an object of the present invention to provide an improved asynchronous data transmission synchronization technique which exhibits a significant reduction in bit error rate and which is readily adaptable to implementation using integrated circuit (IC) techniques.

It is another object of the invention to provide a synchronization and elastic buffer system particularly useful in high speed asynchronous data communication that uses a clock signal having a nominal frequency equal to the data bit rate.

According to the invention, there is provided an asynchronous system including a clock recovery circuit to which the received signal is applied and which provides recovered data to a data frame detector. The data frame detector in turn provides asynchronous data to an elastic buffer which provides as its output the synchronized data. The clock recovery circuit also provides a recovered clock signal to a clock guarding circuit. The clock guarding circuit receives a local clock signal and produces a guarded clock signal and a data clock signal, both of which are supplied to the elastic buffer.

The synchronization method according to the invention uses the guarded asynchronous clock signal derived from the recovered clock signal so that the recovered clock signal cannot switch within a certain zone associated with each active edge of the local clock signal.

BRIEF DESCRIPTION OF THE DRAWINGS

The foregoing and other objects, aspects and advantages of the invention will be better understood from the following detailed description of a preferred embodiment of the invention with reference to the accompanying drawings, in which:

FIG. 5 is a block diagram the elastic buffer circuit used in the synchronization circuit shown in FIG. 1.

DETAILED DESCRIPTION OF A PREFERRED EMBODIMENT OF THE INVENTION

Figure 1:
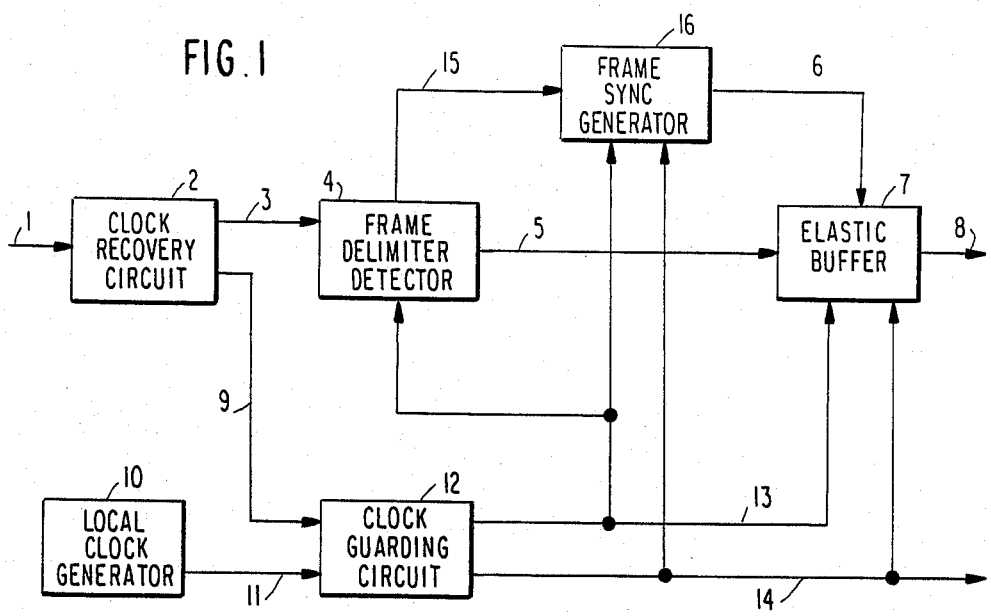
FIG. 1 is a block diagram of the synchronization circuit employing the elastic buffer circuit according to the invention.

Referring now to the drawings, and more particularly to FIG. 1, a received signal is applied to terminal 1 of a clock recovery circuit 2 which provides recovered data on line 3 to a frame delimiter detector 4. The clock recovery circuit 2 may be, for example, AT&T's T7032PC high speed clock recovery circuit. The frame delimiter 4 is of conventional design and typically consists of a shift register and an n-bit equality comparator. One parallel input of the comparator is connected to the outputs of the shift register. Another parallel input is hardwired with the data frame delimiter pattern. Whenever the content of the shift register is equal to the hardwired pattern, there is an output on line 15 from the detector 4.

The frame delimiter detector also provides asynchronous data on line 5 as well as the output on line 15. The asynchronous data on line 5 is supplied to an elastic buffer 7. The elastic buffer also receives a frame sync signal on line 6 from frame sync generator 16 in response to an input on line 15. More specifically, the output signal on line 6 from frame sync generator 16 goes high on the first active edge of a guarded clock signal on line 13 after a new data frame has been detected by frame delimiter detector 4. This output then goes low on the first active edge of a data clock signal on line 14. A simple circuit of two flip-flops will accomplish this function. The elastic buffer 7 provides synchronized data at terminal 8.

The clock recovery circuit 2 provides a recovered clock signal on line 9 to a clock guarding circuit 12 which also receives on line 11 a local clock signal produced by local clock generator 10. The clock guarding circuit 12 generates on line 13 a guarded clock signal and, on line 14, a data clock signal, both of which are supplied to the elastic buffer 7 as well as the frame sync generator 16 as previously described. In addition, the shift register in frame delimiter detector 4 is clocked by the guarded clock signal on line 13.

Figure 2:
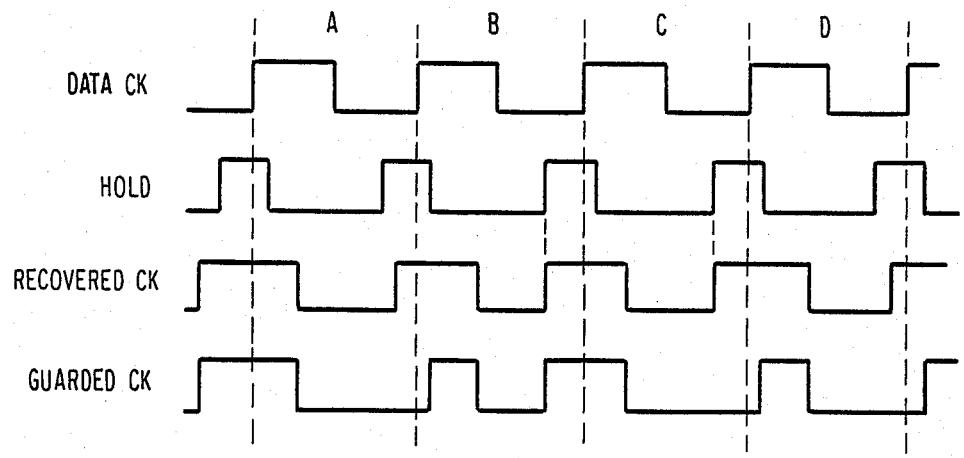
FIG. 2 is a timing diagram illustrating the synchronization method according to the invention.

The synchronization method according to the invention uses a guarded asynchronous clock as illustrated in FIG. 2. The DATA CLOCK signal produced by the local clock 10 on line 11 is shown at the top of the diagram. The rising edge of the clock signal is the active edge; that is, flip-flops are triggered on this edge. The RECOVERED CLOCK signal on line 9 from the clock recovery circuit 2 is guarded so that it cannot switch within certain zones associated with each active edge of the local clock signal. The transition which falls into such zones is delayed. An uncertainty exists when such transition is close enough to these zones, indicated by cycles B and C in FIG. 2. Such a transition is not necessarily delayed. As a result, it is possible to have one active edge of the guarded clock during the local clock cycle (cycle D), two active edges (cycle B) or none (cycles A and C).

Figure 3:
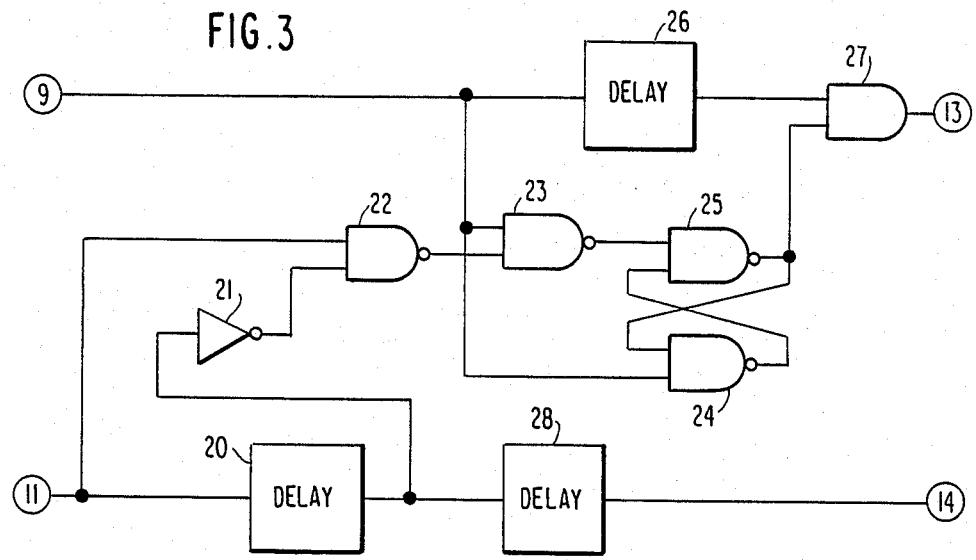
FIG. 3 is a logic diagram of clock guarding circuit used in the synchronization circuit shown in FIG. 1.

Implementation of the clock guarding circuit 12 is shown in FIG. 3. The DATA CLOCK signal on line 11 from the local clock 10 is input to a delay element 20. Delay element 20, invertor 21 and NAND gate 22 produce a HOLD signal (see FIG. 2) which is applied as one input of NAND gate 23, the output of which is connected to one input of NAND gate 25. The cross-coupled NAND gates 24 and 25 form a latch (i.e., a flip-flop) having set and reset inputs. The RECOVERED CLOCK signal on line 9 is applied to the second input of NAND gate 23 and to one input of NAND gate 24 and is used as the toggle for the latch. While the HOLD signal is low, the latch will not change its state from low to high.

The output of the latch comprising cross-coupled gates 24 and 25 is taken from NAND gate 25 and is applied as one input to AND gate 27. The other input to AND gate 27 is supplied from a delay circuit 26 which receives as its input the recovered clock signal on line 9. The output of AND gate 27 is the GUARDED CLOCK signal on line 13. The delay element 26 and gate 27 performs a filtering operation by eliminating narrow glitches at the latch output. Specifically, this circuit chops off the beginning portion of the latch's output signal with the glitch, if there is one.

The output of delay circuit 20 is supplied to a third delay circuit 28 which provides as its output, the DATA CLOCK signal on line 14. The two delay elements 20 and 28 allow setting independently two guarded zones; i.e., before and after the active edge of the data clock. This will be described in more detail with reference to FIG. 5 hereinafter.

Figure 4:
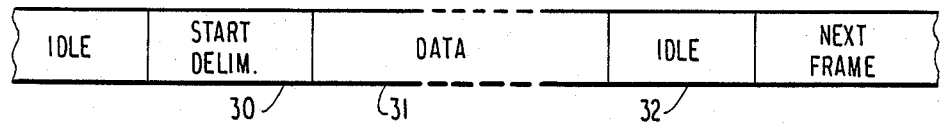
FIG. 4 is an illustration of the format of the data transmission.

FIG. 4 shows the required structure of the transmitted information. The data frame starts with a delimiter 30 followed by data 31. Space between the data frames is filled with idle pattern 32 (typically a clock pattern). The received signal in this format is fed into the clock recovery circuit 2. The recovered data signal is fed to the frame delimiter detector 4 which generates the FRAME START signal that is fed to the elastic buffer 7.

The elastic buffer 7 is shown in FIG. 5. The size of the buffer shown is five bits, but it could be any size desired. Asynchronous data on line 5 is shifted into register 40 using the GUARDED CLOCK signal on line 13. The register 40 is composed of five D-type flip-flops. Parallel outputs of the register 40 are connected via multiplexer 41, composed of five tri-state buffers, to the data input of D-type flip-flop 42. The multiplexer is controlled by the parallel outputs of a shifter 43. Only one of the outputs of the shifter is high at any time under normal operation.

The shifter 43 is composed of five 3-input multiplexers/selectors, one multiplexer for each bit. Each multiplexer has three data inputs A, B and C and two control inputs L (for left) and R (for right). When both control inputs are low, input B is selected in each position, and the parallel output of the shifter 43 is equal to its parallel input. When L is high, input C is selected. As a result, the output of the shifter presents the input shifted left by one position. If R is high, input A is selected, and the shifter produces at its parallel output the input code shifted right by one bit. Both control inputs cannot be high under normal circumstances.

Code from a mask register 44 via the shifter 43 controls the tri-state buffers 41. The mask register is composed of five D-type flip-flops clocked by the DATA CLOCK signal on line 14 and initially loaded by the FRAME SYNC signal on line 6. In the example illustrated, the mask register 44 is loaded with a bit pattern of "00100". This register is reloaded by the output of shifter 43.

The control inputs, L and R, to the shifter 43 are generated by D-type flip-flops 45, 46 and 47. Flip-flop 45 is clocked by the data clock signal on line 14 while flip-flops 46 and 47 are clocked by the GUARDED CLOCK signal on line 13. Flip-flop 45 is reset by the Q* output of flip-flop 46 which, in turn, is reset by the Q output of flip-flop 45. Further, flip-flop 47 is reset by the Q* output of flip-flop 45. The Q output of flip-flop 45 is the control input L, and the Q output of flip-flop 47 is the control input R.

As mentioned, the two delay elements 20 and 28 allow the independent setting of two guarded zones; before the active edge of the DATA CLOCK on line 14 and after the data clock. The zone after the active edge allows the data clock to propagate through flip-flop 45 and reset flip-flop 46 before the GUARDED CLOCK on line 13 switches flip-flop 46. The zone before the active edge of the data clock allows the GUARDED CLOCK signal on line 13 to propagate from flip-flop 46 or 47 through the multiplexers in the shifter 43 and then through the tri-state controls in the multiplexer 41 to the input of flip-flop 42 before the signal is stored in that flip-flop on the active edge of the data clock on line 14.

In operation, the FRAME SYNC signal on line 6 loads "00100" into the mask register 44. The data clock signal on line 14 loads the next data bit into flip-flop 42, sets flip-flop 45 and resets flip-flop 47. Shifter 43 then shifts the mask one position left in response to the L control output from flip-flop 45. If no guarded clock pulses occur on line 13 before the next data clock pulse on line 14, this bit will be read next. The first guarded clock moves the data in register 40 one position right and resets flip-flop 45 via flip-flop 46. The L and R inputs of the shift register 43 are inactive and the same position in register 40 is selected as before. If a second guarded clock pulse occurs on line 13 prior to the data clock pulse on line 14, then flip-flop 47 is set and the mask is shifted right in response to the R control output from flip-flop 47 following the next bit in register 40. The data clock saves the shifted mask in register 44 and it becomes the reference for the next cycle. This clock pulse also initializes flip-flops 45, 46 and 47.

A message will be transmitted without errors as long as the mask does not move out of register 44. If f1 and f2 are the frequencies of the two clocks and f2=f1(1±d), then this buffer is sufficient for data frames up to 2/d bits long.

The guard zone extends before and after the active edge of the data clock. The zone after the edge is needed in order to prevent occurrence of the GUARDED CLOCK signal while flip-flop 45 in FIG. 5 is being set by the DATA CLOCK signal. Such occurrence would result in a loss of a bit. The zone before the edge is required to allow the GUARDED CLOCK signal to set flip-flop 46 and possibly flip-flop 47. Then the output signals of flip-flops 45 and 47 propagate through the shifter 43 and the tri-state buffers 41 before correct data can be stored in flip-flop 42 on the data clock active edge.

In some cases, it is important to ensure fixed delay while synchronizing a signal. This design achieves this goal to within one clock cycle, which is adequate in many cases. This will allow usage of asynchronous communication where synchronous communication would otherwise be required. In addition, the simple design facilitates IC implementation with only a few hundred gates.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A synchronization circuit for asynchronous data communication comprising:
    clock recovery circuit means for receiving a data signal and generating a recovered data signal and a recovered clock signal;
    frame delimiter detector means connected to receive said recovered data signal for generating an asynchronous data signal and a frame start pulse;
    clock guarding circuit means responsive to a local clock signal and said recovered clock signal for generating a guarded clock signal and a data clock signal, said local clock signal and said recovered clock signal having a nominal frequency equal to a data bit rate of said recovered data signal, and said guarded clock signal being derived from the recovered clock signal so that the recovered clock signal cannot switch within a certain zone associated with each active edge of the local clock signal;
    frame sync generator means responsive to said frame start pulse for generating a frame sync signal having a duration determined by active edges of said guarded clock and data clock signals; and
    elastic buffer means controlled by said guarded clock signal and said data clock signal and responsive to said asynchronous data signal and said frame sync signal for generating a synchronized output data signal.

2. The synchronization circuit recited in claim 1 wherein said elastic buffer means comprises:
    shift register means connected to receive said asynchronous data signal and shifted by said guarded clock signal;
    multiplexer means connected to parallel outputs of said shift register means for selecting one of said outputs as a data output;
    mask register means initially loaded with a mask bit pattern in response to said frame sync signal and clocked by said data clock signal for providing a control output to said multiplexer means;
    multiplexer control means responsive to said data clock and guarded clock signals and said mask bit pattern for controlling said multiplexer means; and
    output means for outputting said data output in response to said data clock signal.

3. The synchronization circuit recited in claim 2 wherein said multiplexer control means comprises:
    shifter means receiving said mask bit pattern from said mask register means and providing said control output shifted left or right or not shifted depending on control inputs to said shifter means; and
    control means responsive to said guarded clock and data clock signals for generating said control inputs whereby independently set guard zones are set before and after active edges of said data clock signal.

4. The synchronization circuit recited in claim 3 wherein said clock guarding circuit means comprises:
    latch means clocked by said recovered clock signal;
    first delay element means for producing a delayed local clock signal;
    hold means responsive to said local clock signal and said delayed local clock signal for inhibiting said latch means;
    second delay element means for producing a delayed recovered clock signal;
    gating means enabled by said latch means for gating said delayed recovered clock signal to produce said guarded clock signal; and
    third delay element means connected to said first delay element means for producing said data clock signal whereby said first and third delay element means establish said guard zones.

5. The synchronization circuit recited in claim 2 wherein said multiplexer means comprises a plurality of tri-state devices having inputs connected to respective stages of said shift register means and outputs connected in common, and said output means is a flip-flop having an input connected to the commonly connected outputs of said tri-state devices and clocked by said data clock signal.

* * * * *